United States Patent
Glover

(10) Patent No.: US 9,007,476 B2
(45) Date of Patent: Apr. 14, 2015

(54) REMOTELY CONTROLLED AUTOMATIC CAMERA TRACKING SYSTEM

(71) Applicant: H4 Engineering, Inc., San Antonio, TX (US)

(72) Inventor: Gordon Jason Glover, Corpus Christi, TX (US)

(73) Assignee: H4 Engineering, Inc., San Antonio, TX (US)

( * ) Notice: Subject to any disclaimer, the term of this patent is extended or adjusted under 35 U.S.C. 154(b) by 28 days.

(21) Appl. No.: 13/936,920

(22) Filed: Jul. 8, 2013

(65) Prior Publication Data

US 2014/0009632 A1    Jan. 9, 2014

Related U.S. Application Data

(60) Provisional application No. 61/668,823, filed on Jul. 6, 2012, provisional application No. 61/728,618, filed on Nov. 20, 2012.

(51) Int. Cl.
*H04N 5/232* (2006.01)

(52) U.S. Cl.
CPC ........... *H04N 5/232* (2013.01); *H04N 5/23203* (2013.01)

(58) Field of Classification Search
USPC .......................................... 348/211.99, 211.5
See application file for complete search history.

(56) References Cited

U.S. PATENT DOCUMENTS

| | | |
|---|---|---|
| 4,683,729 A | 8/1987 | Rogers |
| 5,363,297 A | 11/1994 | Larson et al. |
| 5,457,370 A | 10/1995 | Edwards |
| 5,463,432 A | 10/1995 | Kahn |
| 5,491,632 A | 2/1996 | Pawlak et al. |
| 5,572,317 A | 11/1996 | Parker et al. |
| 5,640,007 A | 6/1997 | Talbott et al. |
| 5,802,412 A | 9/1998 | Kahn |
| 6,519,860 B1 | 2/2003 | Bieg et al. |
| 6,596,976 B2 | 7/2003 | Lin et al. |
| 6,650,360 B1 | 11/2003 | Osen |
| 6,690,978 B1 | 2/2004 | Kirsch |

(Continued)

FOREIGN PATENT DOCUMENTS

| | | |
|---|---|---|
| EP | 0660131 A1 | 6/1995 |
| JP | 2008042522 A | 2/2008 |

(Continued)

OTHER PUBLICATIONS

E. Calais, The Global Positioning System, Presentation Slides, available at date of publication unknown, available at URL web.ics.purdue.edu/~ecalais/teaching/geodesy/GPS_observables.pdf.

(Continued)

*Primary Examiner* — Anthony J Daniels

(74) *Attorney, Agent, or Firm* — Volk & McElroy, LLP; Michael D. Volk, Jr.

(57) ABSTRACT

A remotely controlled automatic camera tracking system for self-photography is disclosed. The systems hereof combine the functions of remote camera operation, including closed loop automatic zoom control, and camera tracking by employing a system architecture that eliminates the requirement to have microprocessors coupled to the tracking station for the calculation of range and bearing. The system enables range and bearing information to be viewed by the operator, if desired, and conserves radio power.

4 Claims, 8 Drawing Sheets

(56) References Cited

U.S. PATENT DOCUMENTS

| | | | |
|---|---|---|---|
| 6,744,403 B2 | 6/2004 | Milnes et al. | |
| 6,771,213 B2 | 8/2004 | Durst et al. | |
| 6,867,799 B2 | 3/2005 | Broemmelsiek | |
| 6,952,646 B2 | 10/2005 | Chang | |
| 7,239,975 B2 | 7/2007 | Coleman et al. | |
| 7,245,251 B2 | 7/2007 | Vogel et al. | |
| 7,349,008 B2 | 3/2008 | Rui et al. | |
| 7,365,771 B2 | 4/2008 | Kahn et al. | |
| 7,557,825 B2 | 7/2009 | Ishii et al. | |
| 7,591,195 B2 | 9/2009 | Puzio | |
| 7,672,781 B2 | 3/2010 | Churchill et al. | |
| 7,855,638 B2 | 12/2010 | Huston | |
| 2002/0005902 A1 | 1/2002 | Yuen | |
| 2002/0057217 A1 | 5/2002 | Milnes et al. | |
| 2002/0149681 A1 | 10/2002 | Kahn et al. | |
| 2003/0025614 A1 | 2/2003 | Kahn | |
| 2004/0006424 A1 | 1/2004 | Joyce et al. | |
| 2004/0105010 A1 | 6/2004 | Osen | |
| 2004/0119716 A1 | 6/2004 | Park et al. | |
| 2005/0083433 A1 | 4/2005 | Wishart et al. | |
| 2005/0134458 A1 | 6/2005 | Leyden et al. | |
| 2006/0045613 A1 | 3/2006 | Leyden et al. | |
| 2006/0077258 A1 | 4/2006 | Allen et al. | |
| 2007/0146484 A1 | 6/2007 | Horton et al. | |
| 2008/0001022 A1 | 1/2008 | Sa et al. | |
| 2008/0192116 A1 | 8/2008 | Tamir et al. | |
| 2008/0271220 A1 | 11/2008 | Chilton et al. | |
| 2009/0028386 A1 | 1/2009 | Michimoto et al. | |
| 2009/0145371 A1 | 6/2009 | Kramer | |
| 2009/0267895 A1 | 10/2009 | Bunch | |
| 2010/0026809 A1 | 2/2010 | Curry | |
| 2010/0191651 A1 | 7/2010 | Irmscher et al. | |
| 2011/0050878 A1 | 3/2011 | Wells et al. | |
| 2011/0228098 A1* | 9/2011 | Lamb et al. | 348/164 |
| 2012/0269386 A1 | 10/2012 | Hankins et al. | |
| 2013/0162838 A1* | 6/2013 | Huang et al. | 348/169 |

FOREIGN PATENT DOCUMENTS

| | | | |
|---|---|---|---|
| JP | 2011066768 A | 3/2011 | |
| KR | 1019980043069 A | 8/1998 | |
| KR | 100814096 B1 | 3/2008 | |
| KR | 20100123445 A | 11/2010 | |
| KR | 20110048778 A | 5/2011 | |
| WO | 9501768 A1 | 6/1995 | |

OTHER PUBLICATIONS

Gibbings et al., Assessing the Accuracy and Integrity of RTK GPS Beneath High Voltage Power Lines, 2001—A Spatial Odyssey: 42nd Australian Surveyors Congress, date of publication unknown, available at URL eprints.usq.edu.au/2606/1/gibbings.pdf.
Oncore, Chapter 2 GPS Principles, date of publication unknown, available at URL gpsd.berlios.de/vendor-docs/motorola/ch2.pdf.
Dana M. Sommer, Principles of GPS, Presentation Slides, date of publication unknown, available at URL des.memphis.edu/esra/.../Principles%20of%20GPS%204-13-04.pdf.
Kaplan et al., Understanding GPS Principles and Applications, book, 2006, Artech House, available at URL http://www.bdu.ac.in/ckr/uploads/Earth/GPS%20FULL%20All%20in%201.pdf.
Clifford et al., Measuring Tilt with Low-g Accelerometers, Freescale Semiconductor Application Note, May 2005, Freescale Semiconductor, available at URL http://classes.cecs.ucf.edu/seecsseniordesign/su2006fa2006/g09/files/patrick/measuring%20tilt%20with%20low-g%20accelerometers.pdf.
Kimberly Tuck, Tilt Sensing Using Linear Accelerometers, Freescale Semiconductor Application Note, Jun. 2007, Freescale Semiconductor, available at URL http://www.mh-hannover.de/fileadmin/zentrale_einrichtungen/zentrale_forschungswerkst/downloads/AN3461.pdf.
Barwani et al., Vehicle Dynamics Lab GPS Tracking Camera Turret, web site, 2009, available at URL http://www.me.berkeley.edu/ME102B/Past_Proj/f09/17%20GPS%20Camera%20Turret%20Website/Home.html.
fbvhobby.com, Antenna Tracker, web site, date of publication unknown, available at URL http://fpvhobby.com/116-an.html.

* cited by examiner

REMOTELY CONTROLLED AUTOMATIC CAMERA TRACKING SYSTEM

CROSS-REFERENCE TO RELATED APPLICATIONS

This application claims the benefit of U.S. Provisional Patent Application No. 61/668,823, filed Jul. 6, 2012, titled "Remotely Controlled Automatic Camera Tracking System for Outdoor Self Photography", and U.S. Provisional Patent Application No. 61/728,618, filed Nov. 20, 2012, titled "Method of Autonomous Camcorder Zoom Control for Use with Camera Tracking Systems", the contents of both of which are hereby incorporated by reference in their entirety and are not admitted to be prior art with respect to the present invention by the mention in this cross-reference section.

BACKGROUND

This invention relates to autonomous tracking of objects. More particularly, this invention relates to autonomous tracking of objects for self photography or self recording. This invention also relates to remote wireless control of commercially available cameras such as, for example, digital single-lens reflex (DSLR) cameras and video cameras. When participating in certain activities, it may be desirable to film the activity for later viewing. For example, a surfer may wish to record him or herself surfing from the shoreline. Without a cameraman to move the camera in relation to the movements of the surfer, the resulting video may not appropriately capture the surfing activity. For example, the surfer may move out of the field of view of the camera or may move too far away from the camera to be seen. The systems and methods of the present invention assist in overcoming such problems associated with self-photography or self-recording.

SUMMARY OF THE INVENTION

According to a preferred embodiment hereof, this invention provides a system for automated self-photography comprising a remote control associated with a user, wherein the remote control sends orientation commands to a base comprising a turret associated with a camera, the base also comprising at least one motor that orients the camera at the remote control based on the orientation commands.

According to another preferred embodiment hereof, this invention provides a method for automated self photography of a user comprising the steps of determining the location coordinates of a reference point and of a base wherein a camera is associated with the base; storing the location coordinates of the reference point and of the base; orienting the camera at the reference point; determining the location coordinates of a remote control associated with the user; storing the location coordinates of the remote control in the remote control; periodically updating the location coordinates of the remote control; comparing the updated location coordinates of the remote control to immediately preceding location coordinates of the remote control; determining orientation commands if a change in location coordinates is detected; and transmitting the orientation commands to the base wherein the camera associated with the base is oriented at the user.

DETAILED DESCRIPTION OF THE PREFERRED EMBODIMENTS OF THE INVENTION

Figure 1:
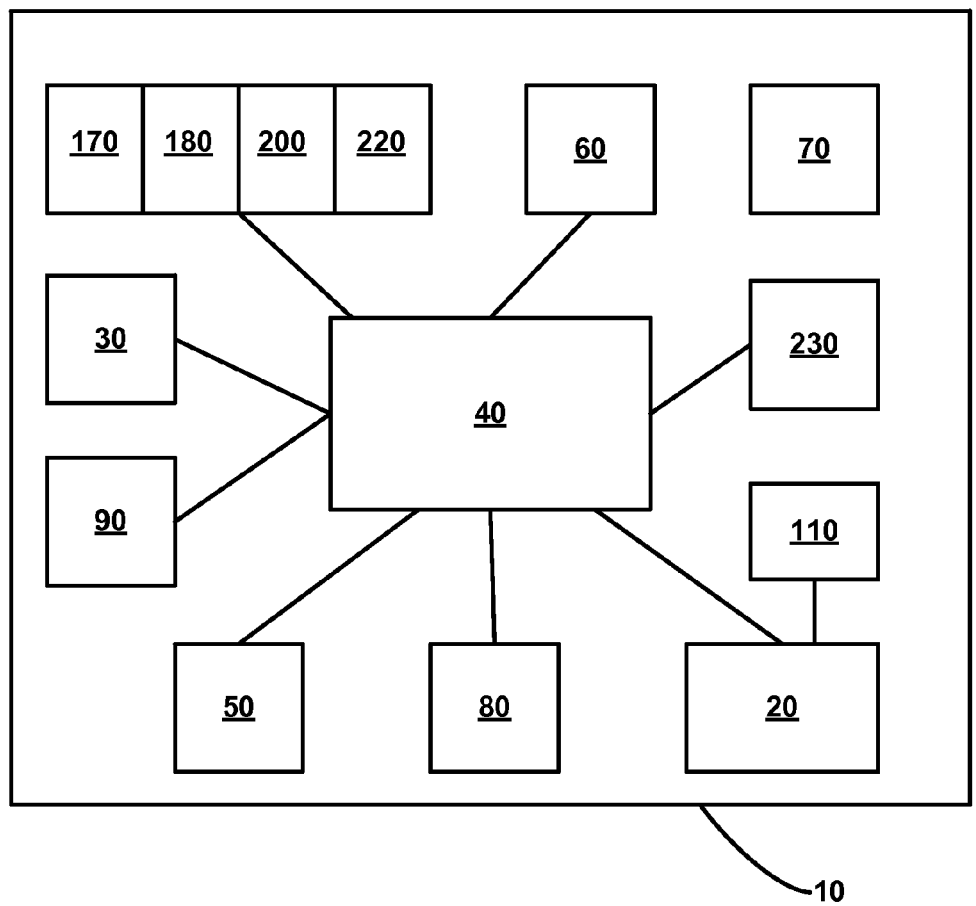
FIG. 1 shows a block diagram illustrating a remote control assembly of an automatic video recording system according to a preferred embodiment of the present invention.

The systems and methods of the present invention combine the features of remote wireless control with the features of autonomous camera and antenna tracking, and employ a novel system architecture that (a) simplifies the wireless transfer of information between the tracking station and the object being tracked, thereby reducing hardware complexity and extending radio range for a given transmitter power, and (b) simplifies the process by which the initial orientation of the tracking station is referenced to the object being tracked, thereby reducing the hardware complexity and the probability of calibration error, and (c) eliminates the requirement to have the attached camera precisely aligned to the tracking station during installation.

The present invention also enables an individual to remotely operate a stationary camera coupled to a pan and tilt mechanism that automatically maintains the operator in the camera's field of view and additionally can automatically narrow or widen the field of view of compatible cameras based on (a) the distance between the tracking station and the operator, and (b) the desired scale of the field of view. The degree to which the operator can control the camera depends on what features the attached camera makes available for remote operation. Features typically available for remote control via a wired or wireless interface can include, but are not limited to the following: (1) shutter operation on still cameras, (2) start/stop recording for video cameras, (3) zoom in and (4) zoom out for cameras with a motorized zoom feature.

Methods of camera and antenna tracking using geo-location data involve the wireless transfer of geo-location data between the object being tracked and the tracking station by either (a) utilizing two separate global positioning devices, one in the object being tracked and one in the tracking mechanism, or (b) utilizing a single global positioning device in the object being tracked and initially co-locating with the tracking station such that a microprocessor inside the tracking station records the initial location of the object via a wireless data link prior to entering into tracking mode. In either case, the object being tracked, i.e., the remote unit must continually send real-time geo-location data back to the tracking station where a microprocessor calculates the azimuth (pan) and altitude (tilt) of the articulating pan-tilt mechanism and directs the mechanism accordingly. As noted above, the systems and methods of the present invention employ a system architecture that eliminates the wireless transfer of geo-location data between the object being tracked and the tracking station by performing all calculations of range, azimuth, and altitude, and also the pan, tilt, and zoom changes required for tracking at the microprocessor inside the remote control. One clear advantage of the systems and methods of the present invention is that they employ a system architecture that does not require the continuous wireless transmission of geo-location data from the object being tracked to the tracking station.

According to a preferred embodiment hereof, a single global positioning device or similar positioning device inside a remote control is used to determine the real-time geo-location of the operator. During set-up, the operator is initially co-located with the tracking station (which, according to one preferred embodiment, comprises a camera turret and a camera attachment mechanism), but the geo-location data of the tracking station is recorded by the microprocessor coupled with the GPS unit inside the remote control. During operation, precise geo-location data are not transmitted to the tracking station; instead only real-time positioning data for the pan, tilt and zoom controls are wirelessly transferred by the remote control to the tracking station along with the other camera operation commands as directed by the operator. Such an arrangement creates a simple and efficient system architecture that (a) eliminates the requirement to have microprocessors coupled to the tracking station for the calculation of range and bearing, (b) eliminates the requirement for two-way communication between the tracking station and the remote control and data error checking of the communication, (c) enables the radio transmitter in the remote control to adjust its output power according to the distance between transmitter and receiver for optimum power management without special telemetry from the tracking station, (d) further enhances power management by transmitting camera positioning and zooming data only when the desired position or zoom angle has changed significantly from the current position or zoom, and (e) enables the operator to perform set-up and calibration of the tracking station from the remote control, thereby reducing hardware complexity and simplifying the set-up and calibration processes. In addition, the system architecture permits simplified product design and manufacturing by incorporating the use of commercially-available hobby R/C radio hardware, servo motors, and camera controls. Differential pulse position modulation may be utilized to encode up to eight channels of 10-bit digital positioning data onto a carrier frequency; the components mentioned are inexpensive, widely available, of sufficient range for the application, commonly pre-certified by the FCC (Federal Communication Commission in the USA or other similar agencies oversees), and are designed to avoid interference with other radios by employing advanced frequency hopping and spread spectrum modulation schemes. Furthermore, in a preferred embodiment the systems and methods of the present invention enable the computed range and bearing information of the operator to be viewed by the operator via an integrated display without special telemetry from the tracking station.

According to one preferred embodiment, about 15 minutes prior to arriving at the location where the system is intended to operate, the operator turns on the remote control to allow the Global Positioning device to begin tracking satellites, and/or receiving location information from terrestrial sources. The operator selects a location for the tracking station, attaches the tracking station to a tripod or other camera base, attaches a camera to the tracking station, selects the desired camera settings and connects the electrical or infrared remote control to the camera. The operator also selects a reference location; this may be a landmark, such as a tree, a fence post, or a wall of a building.

In a particular embodiment of the present invention the tracking station must be oriented such that the area of activity and the distant reference point are both within the same 180 degree pan window. This restriction is not necessary if panning is enabled over 360 degrees, as is in a preferred embodiment of the invention. The locations of both the tracking station and the distant reference point can be set once the remote control indicates that the geo-location data is of sufficient accuracy. Once the two points are fixed, the remote control enters height calibration mode and the operator turns on the tracking station and orients to the camera towards the distant landmark. The operator then attaches the remote to his or her person or equipment. After the height calibration that serves to properly adjust the tilt of the camera, the operator moves to the area of the activity, and the system automatically enters into tracking mode as preferably indicated by a visual indicator on the remote control. When an imaging sequence is desired, the operator presses a button on the remote control and initiates the imaging sequence. The imaging sequence will terminate automatically after a predetermined time interval or pursuant remote control action by the operator.

If the camera is equipped with a remote control interface that incorporates zoom control, the field of view may, in principle, be automatically adjusted as a function of the range such that the recorded image frame size remains about the same as the subject of the recording moves. However, the motorized zoom control of commercially-available camcorders is inherently open loop and manual. This creates problems when using a camcorder with a tracking system where autonomous pan, tilt and zoom control is desired. The zoom setting of a camcorder is typically adjusted incrementally according to user preference. In this mode of operation, zoom position feedback is achieved by visually observing the viewfinder or LCD display. Autonomous control of the zoom setting is complicated by the camcorder's lack of feedback required to relate the existing zoom setting to the desired zoom setting based on the range of the subject. While manual control of camcorder's focal length (i.e., zoom) is possible via a wireless or wired remote control interface, autonomous tracking of the subject's range is not available due to the camcorder's inherent lack of feedback for its current zoom setting. With respect to autonomous tracking systems, if an autonomous tracking system does not continually adjust the field of view based on the range of the subject, then the subject must stay at a relatively fixed distance from the camera. This is undesirable when filming activities that require significant changes in distance between the subject and the camera.

The systems and methods of the present invention manipulate the zoom setting according to the distance between the subject and the camera, thus keeping the subject visually proportional to the camcorder's field of view. A microcontroller is used to manipulate the camcorder's zoom setting through the camcorder's inherent wireless or wired remote control interface. The microcontroller is programmed to manipulate the camcorder's zoom setting based on (1) the distance between the camera and the subject, and (2) the apparent field of view around the subject obtained from the tracking system and set by the user prior to use. This is accomplished by implementing a closed-loop feedback and control mechanism. A microcontroller inside a user operated remote control has the range information between the camera and user. The user or manufacturer calibrates a specific camcorder's zoom range (between minimum zoom, i.e., wide angle, and maximum zoom), divides this range into increments and establishes a functional relationship between focal distance and the number of zoom increments. Note that this relationship is generally strongly non-linear and thus for best results the zoom increment sizes may not be constant. Using the above, autonomous control of the zoom setting is enabled such that the field of view around a subject is held constant as the subject moves closer to or further from the camera.

FIG. 1 shows a block diagram illustrating the remote control assembly of an automatic video recording system according to a preferred embodiment of the present invention. According to one preferred embodiment, remote control assembly 10 (also referred to herein as remote control 10) is preferably in a small waterproof case attached to the operator's person or equipment and contains one or more printed circuit boards and mounting hardware populated with various electrical components including, but not limited to, radio transmitter 20, Global Positioning receiver 30, microcontroller 40, buzzer 50, visual display 90, a pair of push-button switches 60 and 70, power source 80 with an on/off switch (not shown), timer 230, and one or more selector switches, such as shooting mode selector switch 170, time delay selector switch 180, photo/video sequence duration selector switch 200, and photo rate selector switch 220. Global Positioning receiver 30 may be a GPS unit and it communicates via a serial (UART) data link to microcontroller 40 and passes to it NMEA-formatted sentences at a rate about between one and 10 Hz, as determined by the shooting mode switch 170 and photo frame rate switch 220 settings. Microcontroller 40 initializes the Global Positioning receiver 30 upon startup. Microcontroller 40 communicates with the tracking station (see FIG. 2, the other main part of the tracking apparatus) via radio transmitter 20 and using antenna 110. Antenna 110 may be a compact PCB-mounted "chip" antenna. Microcontroller 40 is coupled to a buzzer 50, to momentary pushbutton switches 60 and 70, to visual display 90, to timer 230, and to selection switches 170, 180, 200 and 220. Momentary switches 60 and 70 are accessible to the operator from the outside of the case of remote control assembly 10 and flip the logic states of digital input pins to microcontroller 40 when activated by the user to perform various functions. Timer 230 tracks the microcontroller clock which starts at zero when it is powered up and overflows (i.e., goes back to zero) at $2^{32}$ milliseconds. In order to get a time from the "timer" the current value is subtracted from the "start timer" value. Different microcontrollers use timers differently so practical implementation may vary. One can imagine the timer as a stopwatch that never stops, it just resets to zero at power up or on a "start timer" command.

Figure 2:
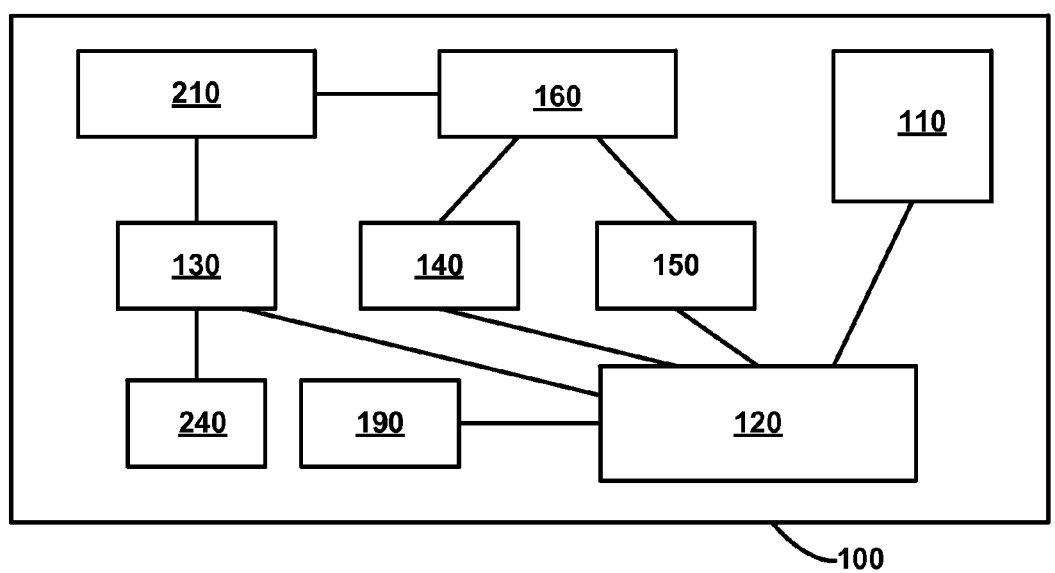
FIG. 2 shows a block diagram illustrating a tracking station of an automatic video recording system according to a preferred embodiment of the present invention.

FIG. 2 shows a block diagram illustrating the tracking station or base 100 of the automatic video recording system according to a preferred embodiment of the present invention. Tracking station 100 is a stationary component that keeps a digital camera 210 pointed at the operator. Radio transmitter 20 of the remote control (see FIG. 1) communicates wirelessly with radio receiver 120 using the world-wide license-free 2.4 GHz ISM band. Radio receiver 120 transmits signals from remote control assembly 10 to position pan motor 140 and tilt motor 150. In addition, radio receiver 120 remotely operates the camera via an electrical or infrared (IR) remote control camera interface 130 that resides within tracking station 100. Pan motor 140 and tilt motor 150 are preferably servo motors. Tracking station 100 also preferably comprises a high-gain directional antenna 110, a radio receiver 120, a camera remote control interface 130, a digital camera 210, and a camera turret 160. Camera turret 160 supports camera 210 and is used to position it as the pan and tilt servos 140 and 150 turn. Radio receiver 120 collects the modulated RF signal (arriving from the remote control assembly 10) via antenna 110. Antenna 110 is preferably a patch antenna or other directional antenna. Antenna 110 is mechanically coupled to turret 160 in order to be always oriented at the remote control 10 for improved gain of RF energy coming from that direction and to lower the gain from other directions. Radio receiver 120 transmits pan and tilt position settings directly to the pan 140 and tilt 150 servo motors. Remote control commands are passed to digital camera 210 via remote control interface 130. Camera control interface 130 may be equipped with a microcontroller (not shown) that could be employed in calculating zoom variables and commands. There is also a button switch 240 for zoom calibration which is used if camera 210 has remote zoom control capability. Finally, tracking station 100 also comprises power source 190 with and an on/off switch (not shown).

During normal operation microcontroller 40 continues to receive Global Positioning data (fixes) and calculates the range (zoom), azimuth (pan) and altitude (tilt) from tracking station 100 to remote control assembly 10. The output power of radio transmitter 20 is adjusted based on the range to the radio receiver 120. In a preferred embodiment of the present invention, the computed information is translated into a Differential Pulse Position Modulation scheme compatible with hobby R/C radios (1-2 millisecond 10-bit logic-level pulses, 20 millisecond frames, for example) by remote microcontroller 40 and these are sent wirelessly from radio transmitter 20 to radio receiver 120, where the signal is demodulated to pulse width control (PWC) and passed to servomotors 140 and 150 and to remote control interface 130 of camera 210. Servo-motors 140 and 150 position the pan-tilt mechanism of camera turret 160 to maintain the operator in the field of view of camera 210.

A preferred embodiment of the present invention may be constructed, for example, using commercially available electrical and mechanical components. A small, durable, watertight clear plastic case similar to those used to protect cellular phones and handheld GPS units may be used to protect the elements of remote control assembly 10. A 2.4 GHz R/C hobby radio module utilizing at least 4 channels of at least 10 bit digital positioning per channel, and utilizing spread spectrum technology (including, but not limited to FHSS or DSSS) to avoid interference with other operators in the same band, could enable wireless transmission of data over ranges compatible with the use of telephoto camera lenses. The components of remote control 10 may be mounted to a custom printed circuit board (PCB). Electrical and infrared (IR) remote control interfaces compatible with servo PWM signal input for all types of commercially available cameras are widely available and may be employed.

Remote control 10 preferably comprises an internal 2.4 GHz antenna oriented preferably such that the plane of highest omnidirectional transmission gain is parallel to the horizon at least when remote control 10 is in the position that is most common, or most prevalent, in a particular application. For example, for a biking application, remote control 10 may be attached to an armband in such a way that the antenna transmits in the plane of the armband. Optimally, GPS unit 30 is mounted during manufacturing such that it is oriented orthogonally to antenna 110 and remote control 10 has an "Up" direction, i.e., a direction that orients Global Positioning sensor 30 to the sky and antenna 110 along the horizon. Preferably, the user is aware of this, and, for example, puts on the armband that holds remote control 10 accordingly.

In a preferred embodiment of the present invention, the pan-tilt mechanism has a rigid construction that provides maximum stability. One may employ digital R/C hobby servos with additional gearing for slower motion and increased power. Preferably, the pan servo is capable of at least 180 degrees of rotation, which is common with programmable digital servos.

Tracking station (also referred to as base) 100 comprises camera turret 160 controlled by servomotors, preferably with internal closed-loop position feedback and a standard pulse width control (PWC) interface. For activities where the camera and the operator are at the same altitude, automatic tilt adjustments can be omitted without deviating from the teachings of the present invention.

For activities where the operator stays a relatively constant distance from camera 210 while moving laterally, or if camera 210 does not facilitate remote control of zoom in/out, automatic zoom control can be omitted. A simplified embodiment of the present invention maintains the inventive system architecture described herein while it may omit any or all operator control of camera 210 thereby employing only a rotating turret for panning a video camera while the camera records continuously.

In a preferred embodiment hereof the tracking apparatus of the invention has three operating modes: set-up, elevation (height) calibration, and tracking. During set-up, the geo-location of the tracking station 100 (also referred to as the base) and that of a distant reference point must both be recorded, in no particular order, by the microcontroller 40 in remote control 10. The reference point may be a landmark, a tree, a fence, a wall, or another object in the vicinity of the intended filming or recording location. The reference point must be distant enough from the tracking station or base 100 to minimize the angular uncertainty of the direction between them as determined based on the geo-location of each. In practice the distance between the base and reference points is typically in the 100 meter range. A good way of setting this distance is to make it comparable to the distance between the tracking station 100 and the user during the activity that the system is intended to record. The GPS unit 30 is initialized at power up of the remote control 10 by receiving commands from the microcontroller 40 and it continually sends geo-location data at a predetermined rate (typically one to 10 Hz) to the microcontroller 40 for processing. Immediately after initialization the GPS data are not useful. Until the quality of GPS data is good enough to set base and reference locations, the data quality is checked and the system waits for new data. Once the GPS data meet predetermined precision criteria based on the Horizontal Dilution of precision as calculated by the GPS unit, the visual status indicator 90 tells the user/operator that the geo-location of the tracking station 100 and that of the reference point are ready to be recorded.

Figure 3:
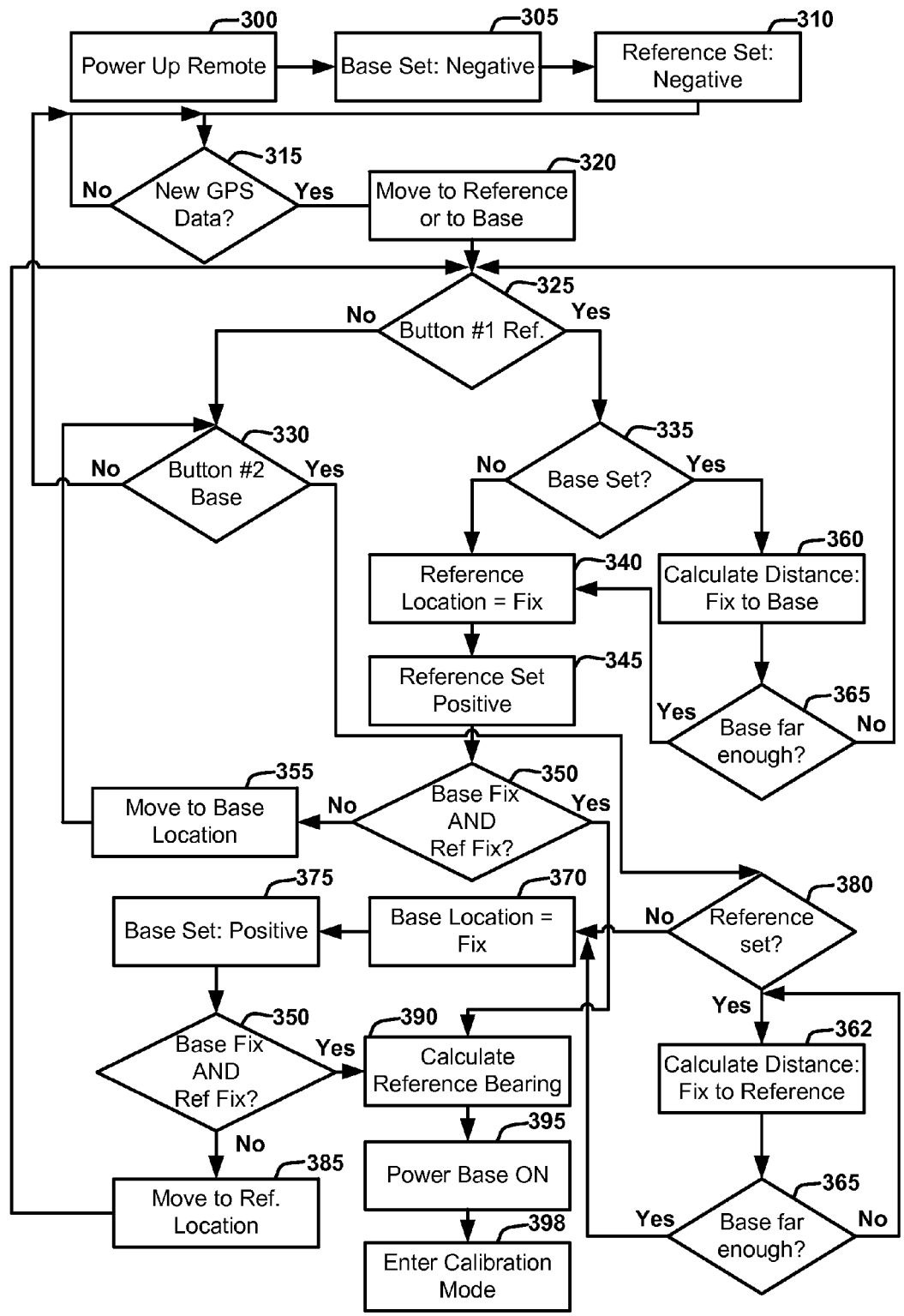
FIG. 3 shows a flow chart illustrating the operation of a first preferred embodiment of the setup mode of an automatic video recording system according to a preferred embodiment of the present invention.

A first preferred embodiment of the setup mode of the apparatus is illustrated using the flow chart of FIG. 3. According to this embodiment, the operator may set the reference point location first, then the base location, or may set them in reverse order. In step 300 the user turns on remote control 10. The remote control 10 automatically enters set-up mode when power is supplied from the power source 80, step 300. The Base Set and Reference Set variables are initialized to negative, steps 305 and 310. Once GPS data is received, step 315, remote control 10 will continue to receive data. The user first moves either to the base or to the reference location, step 320. If the user moves first to the reference location, once there, the user presses the "set reference location" button (Button #1 Ref.), step 325. A button press results in saving the last GPS data received by remote control 10 that are based on reception from sufficient number of satellites, also called "fix". (In this description fix means horizontal fix, i.e. height data are not used because of insufficient GPS precision. See the section concerning height calibration below for a discussion.) Since the base has not yet been set, step 335 No, the reference location is immediately set to the last fix, step 340. The Reference Set variable is set to Positive, step 345. Since the base location has not yet been set, step 350 No, the user must move to the base location while GPS data continue to be received, step 355. Once the user is at the intended base location, he presses the "set base location" (Button #2 Base), step 330. Since the reference point has already been set, step 380 Yes, the logic calculates the distance between the last fix (the intended base location) and the reference point location, step 362. If the last fix is far enough from the reference point, step 365 Yes, then it is recorded as the base location, step 370, and the Base Set variable is set to Positive, step 375. Since now both Reference Set and Base Set variables are set to Positive, the reference bearing is calculated, step 390. The user then powers up the base, step 395 while the remote control enters calibration mode, step 398.

If the user opts for setting the base location first, he or she goes to the base location first, step 320 and when there, he skips pressing button #1, step 325 No, and proceeds to pressing button #2, step 330 Yes. Since the reference point is not yet set, step 380 No, the system sets immediately the base location to the last fix, step 370, and the Base Set variable is now Positive, step 375. Since both base and reference have not been set to fixes, step 350 No, the user moves to the reference location, step 385, where the user pushes button #1, step 325. Since the base is set, step 335 Yes, the system calculates the distance between the last fix and the base location, step 360. If the base location is far enough from the last fix, it can be set as the reference location, step 340. If the distance between the last fix and base location is insufficient, step 365 No, the user finds a suitable reference point farther, moves there, and repeats push of button #1, step 325.

Figure 4:
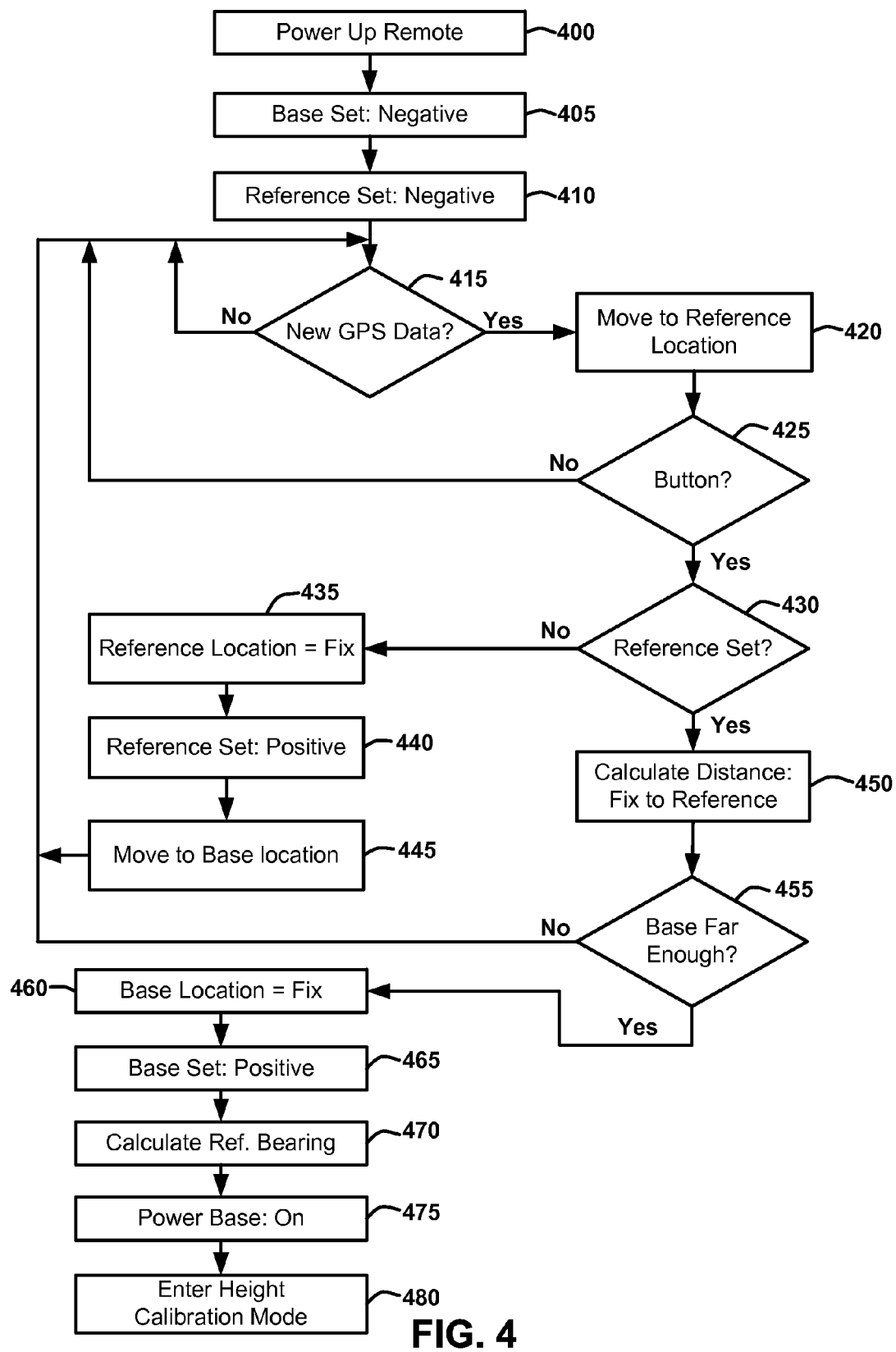
FIG. 4 shows a flow chart illustrating the operation of a second preferred embodiment of the setup mode of an automatic video recording system according to a preferred embodiment of the present invention.

In another preferred embodiment the inventive system employs a remote control 10 with a single button; the setup operation for this embodiment is illustrated in the flow chart of FIG. 4. As previously discussed, remote control 10 automatically enters set-up mode when power is supplied from the power source 80, step 400. The Base Set and Reference Set variables are initialized to negative, steps 405 and 410. Once GPS data is received, step 415, remote control 10 will continue to receive data. In this embodiment, the user first moves to the reference location, step 420. Once there, the user presses the button, step 425. The button press results in saving the last GPS fix received by remote control 10. If the reference location has not been set yet, step 430 No, then it is set at this time to the last fix, step 435. The Reference Set variable is set to Positive, step 440. Since the base location has not yet been set, the user moves to the base location while GPS data continue to be received, step 445. Once the user is at the intended base location, he presses the button, step 425. Since the reference point has already been set, step 430 Yes, the logic calculates the distance between the last fix (the intended base location) and the reference point location, step 450. If the last fix is far enough from the reference point, step 455 Yes, then it is recorded as the base location, step 460, and the Base Set variable is set to Positive, step 465. Since now both Reference Set and Base Set variables are set to Positive, the reference bearing may be calculated, step 470. The user then powers up the base, step 475 while the remote control enters calibration mode, step 480.

Figure 5:
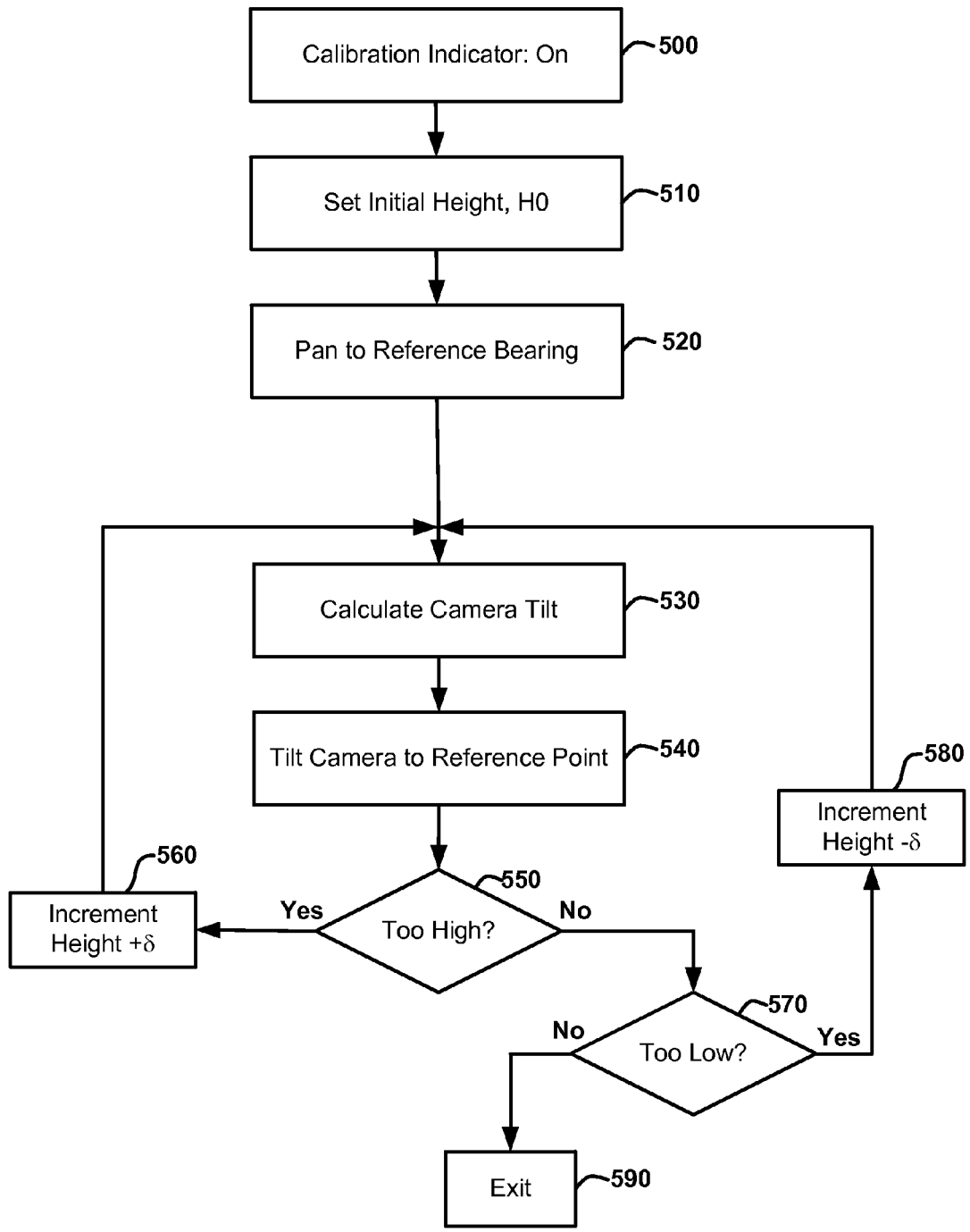
FIG. 5 shows a flow chart illustrating the operation of a calibration mode of an automatic video recording system according to a preferred embodiment of the present invention.

The height calibration mode of the inventive system is illustrated in FIG. 5. In a particular embodiment of the invention the tilt capability of the inventive system is omitted and hence the entire height calibration is omitted as well. Height calibration would also be omitted if, perhaps due to technological progress, GPS fixes would become at least as accurate for elevation as they currently are for latitude and longitude. Generally, height calibration is necessary because current Global Positioning devices do not provide sufficient elevation accuracy to set the elevation (height) of base 100 for subsequent use in tracking. The height of base 100 must therefore be determined using a calibration process. In a preferred embodiment, visual status indicator 90 (see FIG. 1) tells the operator when the system has entered height calibration mode, step 500. The height setting, $H_0$, of base 100 is read, step 510; this initial setting is an estimated value of the height difference between camera 210 and the reference point. Next, camera 210 is panned around a vertical axis, with no tilt to the direction of the reference point, step 520. Using the height setting $H_0$ of the base and the base to reference distance, a tilt angle is computed, step 530, and camera 210 is tilted accordingly, step 540. The user observes whether camera 210 points at the reference point. If camera 210 is actually oriented above the reference point, then the tilt is insufficient because the $H_0$ height used in the calculation is too small. The user pushes button #1, step 550 and an incremental value δ is added to $H_0$, step 560. The increment δ may be around 0.5 meters in most practical cases. The system returns to step 530 to compute a new tilt angle. If camera 210 is actually oriented below the reference point, then the tilt is too large because the height used in the calculation is too large. If that is the case, the operator pushes button #2, step 570 and an incremental value δ is subtracted from the previous height, step 580. If buttons are not pushed the height is accepted and the system exits from the height calibration mode, step 590.

The setup and calibration processes described above in reference with FIGS. 3-5 eliminate the need for precise alignment between camera 210 and turret 160 because the reference is calibrated with the camera bore-sight and not with any other feature of tracking station 100. It is, however, necessary to make sure that the relative orientations of the camera 210 and turret 160 are fixed for the duration of the recording (when the system is in tracking mode).

Figure 6:
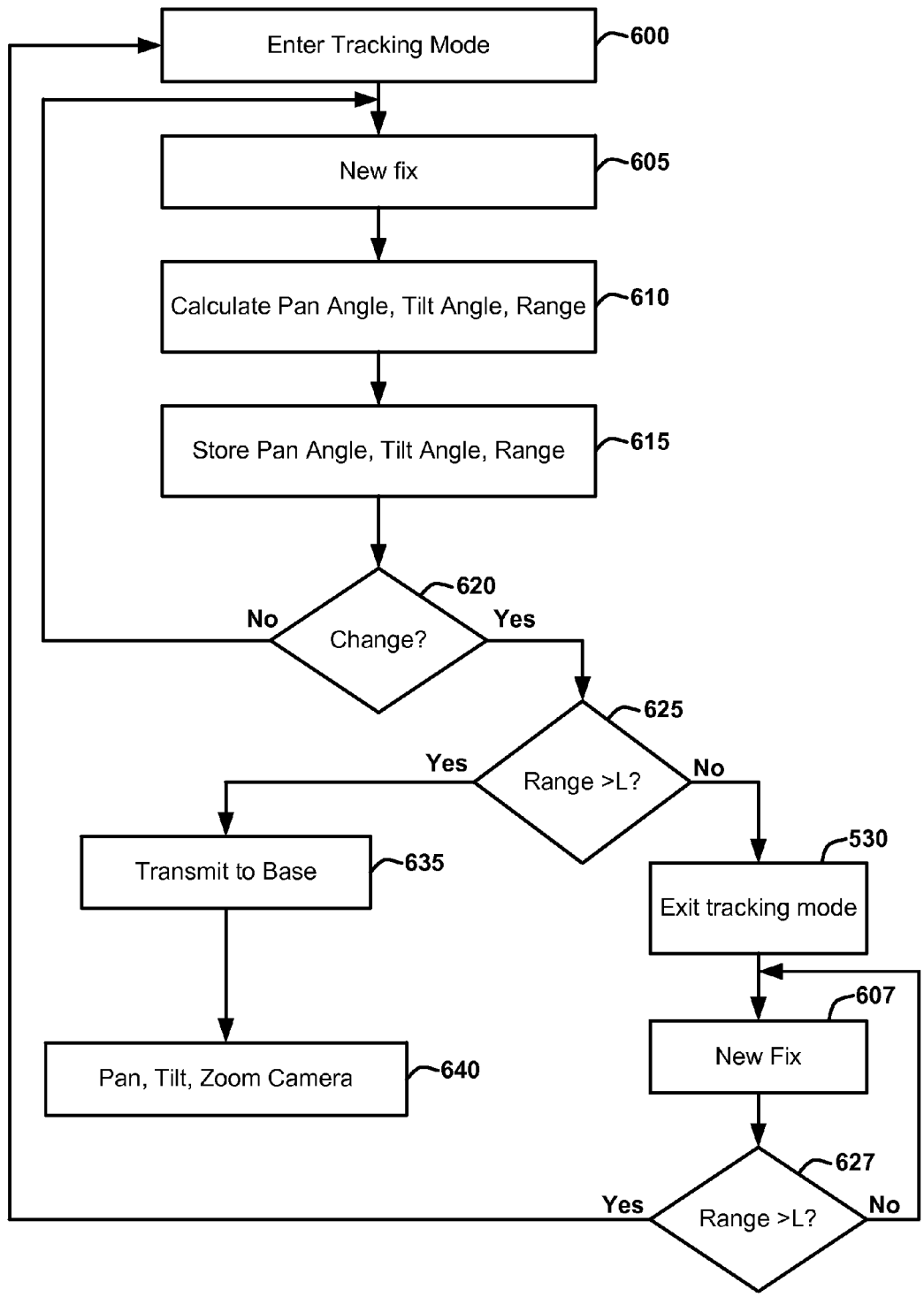
FIG. 6 shows a flow chart illustrating the operation of a tracking mode of an automatic video recording system according to a preferred embodiment of the present invention.

The inventive system enters in tracking mode after setup and height calibration are completed. As illustrated by FIG. 6, after the system enters tracking mode, step 600, new fixes are received by GPS 30 in remote control 10, step 605. Once a fix is received, microcontroller 40 calculates pan angle and tilt angle between tracking station 100 and the fix using the reference bearing to determine the relative pan angle of camera 210 and the range/altitude difference to calculate the absolute tilt angle (i.e., tracking data), step 610. The range is used to determine the zoom setting if the auto-zoom feature is enabled and the auto-zoom calibration routine has been executed as described below with reference to FIG. 8. Any filtering of the pan/tilt/zoom settings that may be applied in practice is executed during this process. Tracking data corresponding to the two last fixes are stored in the memory of microcontroller 40, step 615. If there is no change in the tracking data corresponding to the last fix compared to those corresponding to the preceding fix, step 620 No, the system simply waits for a new fix. If there is change, step 620 Yes, the system checks whether the range between base 100 and the last fix exceeds a predetermined value, for example L=15 meters, step 625. If yes, the system remains in tracking mode and the tracking data are transmitted to base 100, step 635, and executed there, step 640. If the range is smaller than L, step 625 No, the system returns into calibration mode, step 630. When a new fix is received, step 607, the range to the base is calculated and compared with the preset value, step 627. If the range does exceed the preset value (Yes), the system returns to tracking, otherwise (No) it stays in calibration mode. Note that for the purposes of step 620, change may be defined as the difference between two consecutive GPS fixes exceeding the precision of the GPS antenna. One may also set the change in location to a fixed value, for example two feet in any direction.

In the above described embodiment of the invention, if the operator returns to tracking station 100, the system automatically re-enters calibration mode. In keeping with the flow chart of FIG. 5, camera 210 automatically pans towards the distant reference point. This allows the operator to check and, if necessary, to re-calibrate the azimuth.

Turning now to the remote control operation of camera 210 (see FIGS. 1 and 2), in a preferred embodiment of the present invention no commands like RECORD or STOP are sent as a "toggle" commands. A toggle command is what a person does when manually operating a camcorder. A button is pressed to start or to stop the recording sequence. The reason toggle commands are not sent from remote control 10 is because the synchronization between RECORD and STOP might be lost if a single toggle command is sent but not received by tracking station 100. If this were to happen, remote control 10 would indicate the opposite of the actual state of camera 210. To avoid this situation, a binary command is sent continuously (i.e., each GPS cycle) from remote control 10 to base 100. This binary command is either positive or negative. A positive command is interpreted by the receiver to place and keep camera 210 in RECORD mode. A negative command is interpreted by the receiver to place and keep camera 210 in STOP mode. If the signal is momentarily lost, camera 210 will maintain the last known setting until a new signal is received. This creates a positive control of the RECORD/STOP mode of camera 210 such that synchronization cannot be lost between it and remote control 10.

Figure 7:
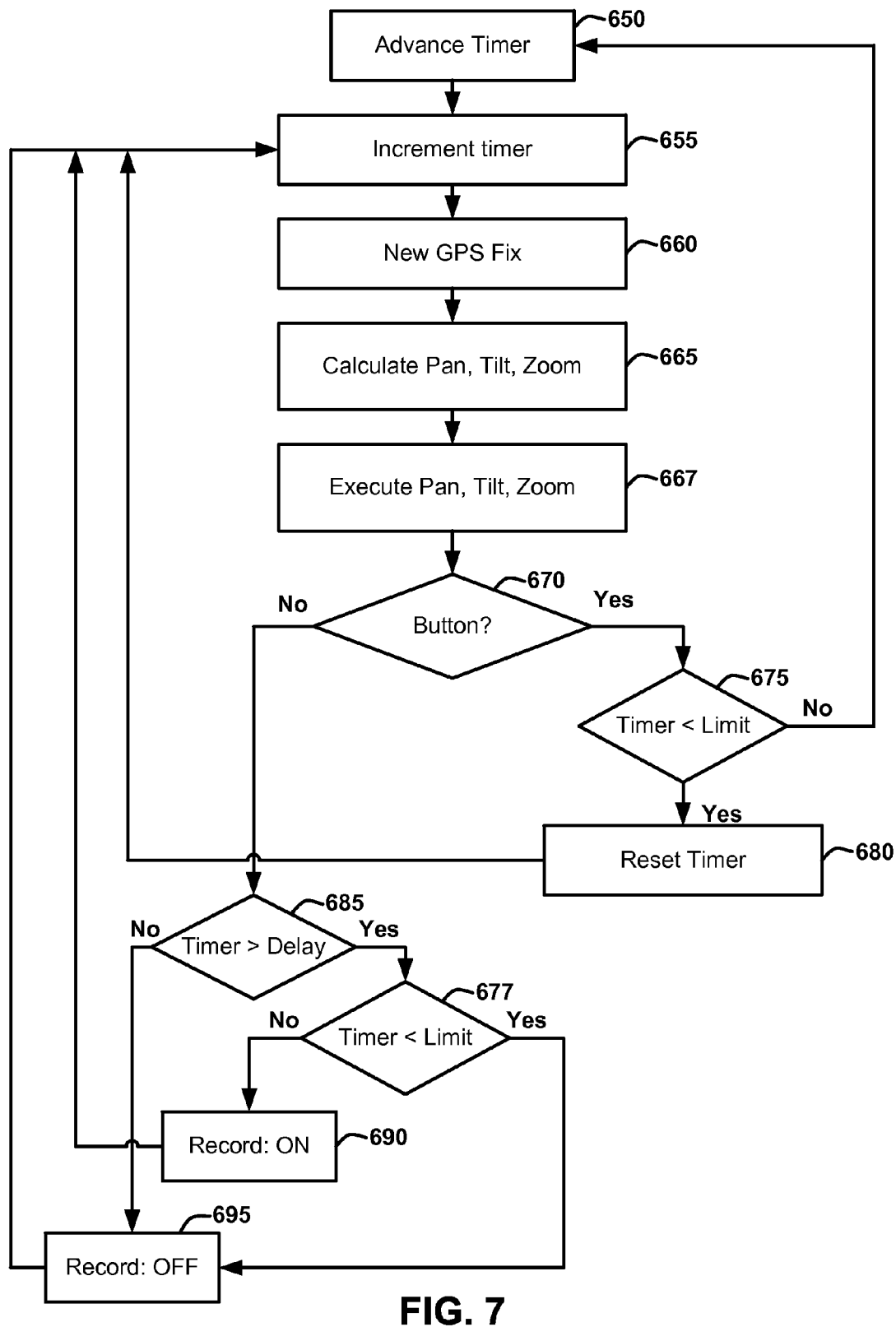
FIG. 7 shows a flow chart illustrating remote control of the camera on/off function of an automatic video recording system according to a preferred embodiment of the present invention.

FIG. 7 shows a flow chart illustrating the timing of remote control of the camera RECORD/STOP or ON/OFF function of the automatic video recording system according to a preferred embodiment of the present invention. Before tracking, the user sets a recording delay time value and a recording time limit value. Pictures or video are recorded when delay time<timer value<time limit. There are various ways these can be set. For example, remote control 10 may have a toggle switch that selects between photo mode and video mode. In photo mode, there is a 5 second delay and 30 second limit. In video mode, there is a 3 second delay and an "infinite" (larger than the battery life) limit.

As the system enters in tracking mode, timer 230 (see FIG. 1) is "advanced", i.e., it is set to one time increment greater than the preset recording time limit, step 650, so that camera 210 is not put in RECORD mode until later. The time increment may be set equal to the time between two GPS fixes, or may be specific to the internal clock of a microcontroller. The system receives a new GPS fix, step 660, calculates tracking parameters, step 665, and orients camera 210, step 667, but recording does not start yet. This feature conserves memory by recording only at the times when the user does something he or she wants to record.

If the button is not pressed, step 670 No, the timer value will be greater than the delay, step 685 Yes, and greater than the limit, step 677 Yes, so a signal corresponding to recording OFF, step 695, is sent to camera 210 and video or pictures are not taken. The logic increments the timer value, step 655 and the cycle starts again. If the button is pressed, step 670 Yes and the timer value is greater than the limit, step 675 Yes, the timer will re-start at zero units, step 680, increments to the next value, step 655 and the cycle starts again. However, at this time, if the button is not pressed again, step 670 No, the timer may or may not exceed the preset delay, step 685. If the time is less than the delay, 685 No, the record OFF state remains in effect, step 695. If, however the time exceeds the delay, 685 Yes, then the system checks if it also exceeds the limit, step 677. If not, 677 No, then camera 210 receives a Record ON command, step 690, the timer is incremented and the cycle is repeated until such time when at step 677 the timer is past the limit, 677 Yes. If so, the camera receives a record OFF command, step 695. If the user decides to manually stop the recording prior to the time when the timer value exceeds the limit, he or she presses the button, step 670. At this time the timer value is below the limit, step 675 No, and the timer value is advanced instantaneously to a value that exceeds the limit by one increment, step 650. In subsequent cycles, this will cause camera 210 to remain in OFF state until the button pressed again, step 670.

In a preferred embodiment of the present invention, when the operator desires a photographic or video sequence, momentary switch 60 is activated and a command is transmitted from radio 20 to the receiver 120 and passed to the camera 210 via remote control interface 130. A buzzer 50 inside the remote control assembly 10 may be activated during the imaging sequence to alert the user that an imaging sequence is underway. After a predetermined user selectable time interval, or upon subsequent activation of momentary switch 60, the imaging sequence terminates. For an imaging sequence of still photographs, the radio transmitter 20 repeatedly sends commands to take single pictures at a predetermined frequency which is synchronized with the position updates such that camera 210 is not being re-positioned while the shutter is operational. For a video sequence, interpolations to the GPS data are performed via a smoothing algorithm such that camera 210 is repositioned at a rate that meets or exceeds the video frame rate.

In a preferred embodiment of the present invention tracking station 100 may be equipped with a variety of cameras 210, see FIG. 2. If that is the case, zoom calibration is carried out by the user for a specific camcorder. Once zoom calibration is complete, calibration data are stored in the memory of microcontroller 40 (see FIG. 1), so that subsequent calibration is not required unless a different camera is used.

Figure 8:
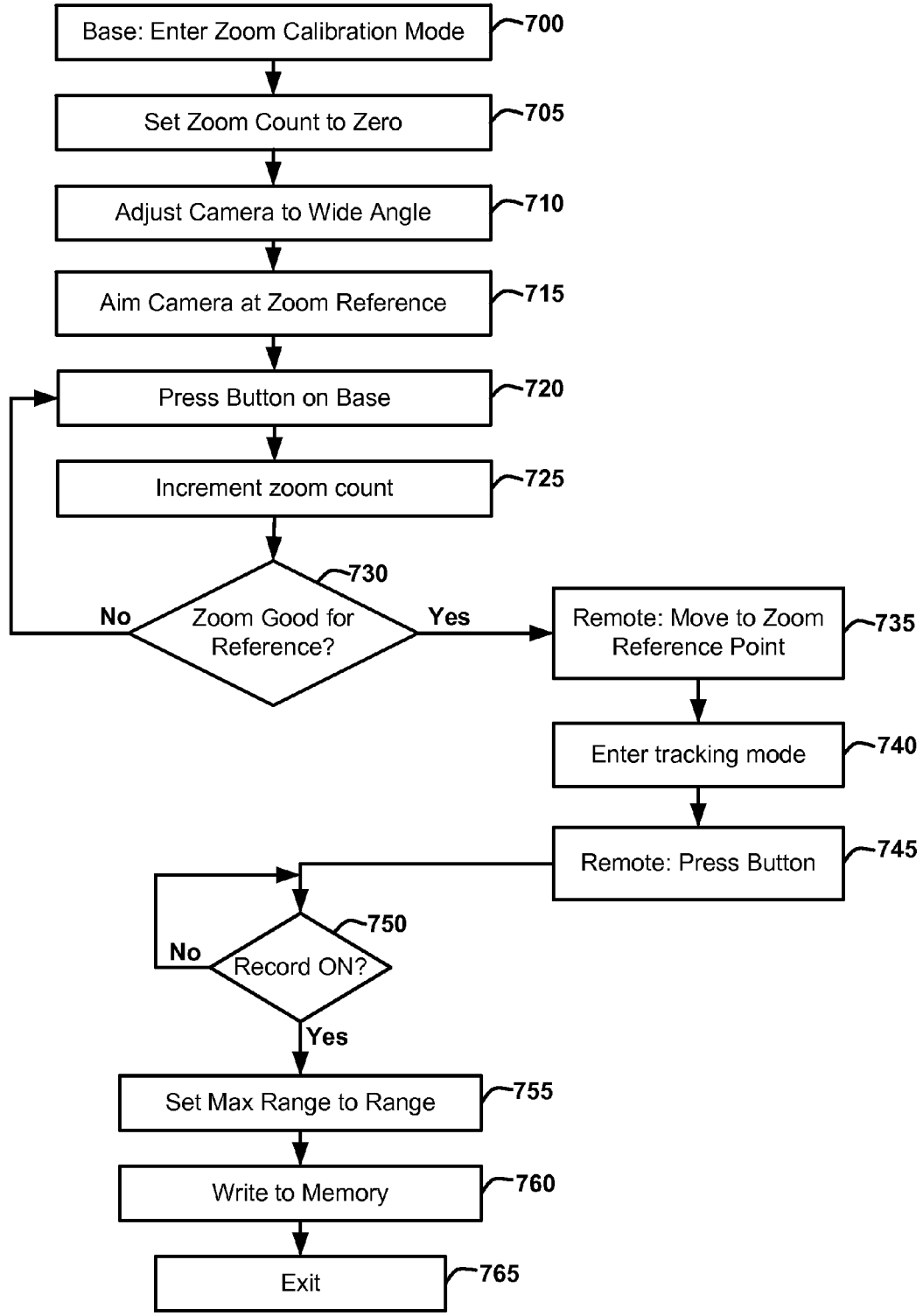
FIG. 8 shows a flow chart illustrating a zoom calibration process of an automatic video recording system according to a preferred embodiment of the present invention.

FIG. 8 shows a flow chart illustrating the zoom calibration process according to a preferred embodiment of the invention. It is assumed that the system has been set up (see FIG. 3 and FIG. 4) and, because the user is still at base 100, the system is not in tracking mode (see FIG. 6). If base 100 is powered up while button 240 is pressed, base 100 enters zoom calibration mode, step 700. The zoom count variable is set to zero, step 705, and camera 210 is manually adjusted to the widest zoom possible, step 710. The camera is manually aimed at a zoom reference, step 715. The zoom reference may be the same reference as used in setup, or it may be a different object. The purpose of the zoom reference is to correlate the maximum desired activity distance (maximum range) with a particular level of zoom. With camera 210 aimed at the zoom reference, button 240 is pressed and the zoom count variable is incremented while a single zoom command is sent to the camera for a fixed duration. For example, zoom command may be sent for one second. In the embodiment discussed here, the shorter the duration of the command, the smaller is the effect on the zoom angle of camera 210. In other words, each zoom command adjusts the camera incrementally and the finer the more numerous the zoom stages between wide and telephoto are, the finer is the control of the zooming. An alternative embodiment may couple the zoom increment instead of command duration to, for example, voltage level. Next the user decides whether the zoom is good for the zoom reference, step 730. If not (730 No) the process of button-push 720 and zoom increment 725 is repeated until the zoom is appropriate for the zoom reference point, 730 Yes. Now the user takes remote control 10 to the zoom reference point, step 735 and consequently the system enters in tracking mode, step 740. The user presses a button on remote control 10, step 745, and this results in sending a Record ON command to camera 210. When the Record ON command is received, step 750 Yes, the range of remote control 10 from tracking station 100 is set to be the maximum range for zoom purposes, step 755. (Until the Record ON command is received, step 750 No, the system keeps waiting for it.) After the maximum range is set, the number of zoom increments is saved, step 760, as the number of zoom commands (zoom steps) required to achieve the proper zoom at the maximum zoom range. The information is stored for later use, so the calibration procedure does not need to be executed again unless a different camera is used or the operator decides to change the desired zoom range. The system is ready to exit zoom calibration and operate in tracking mode, step 765.

Figure 9:
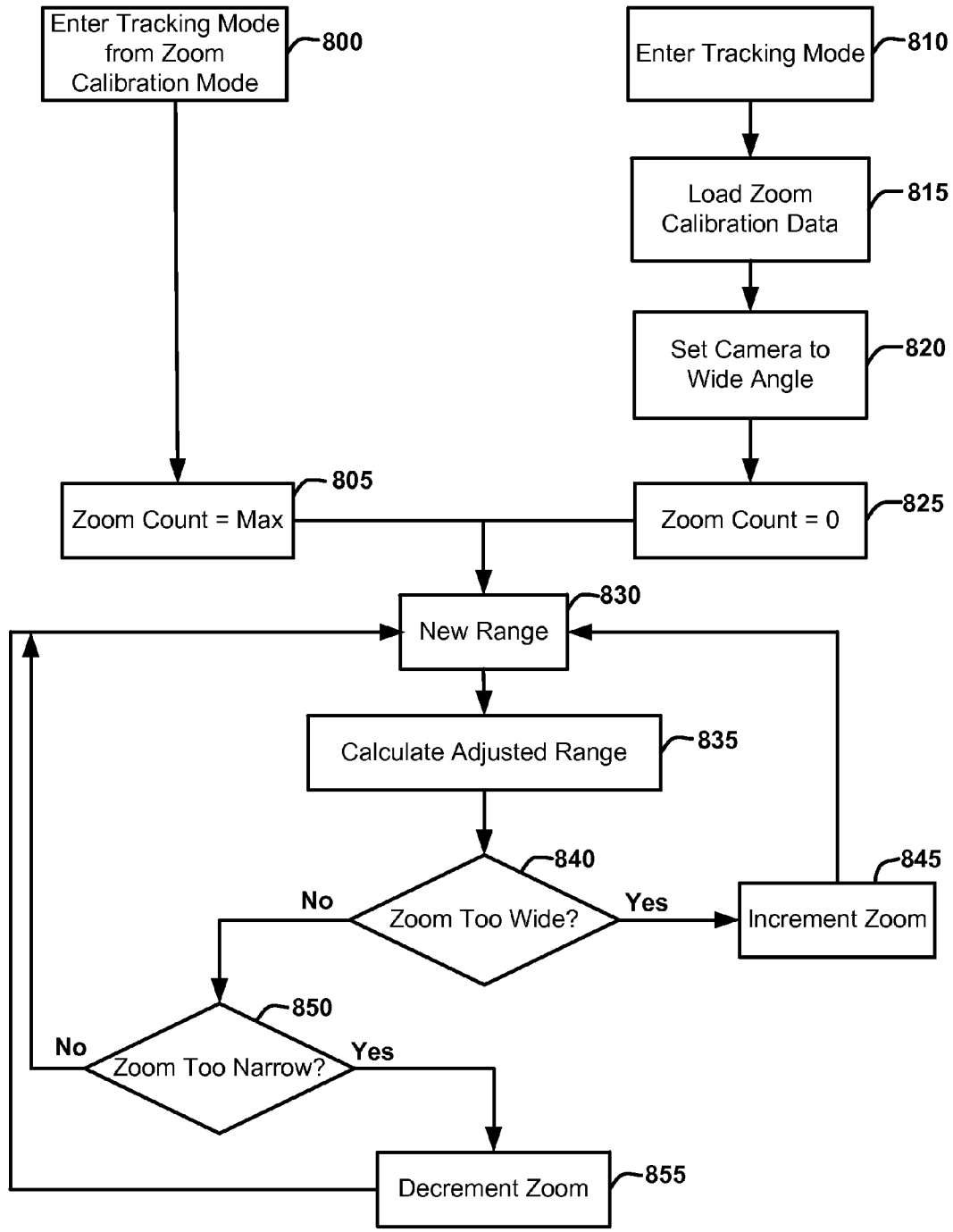
FIG. 9 shows a flow chart illustrating closed loop zoom control of an automatic video recording system according to a preferred embodiment of the present invention.

FIG. 9 shows a flow chart illustrating the closed loop zoom control of an automatic video recording system according to a preferred embodiment of the present invention. The system may enter into tracking mode either when zoom calibration is complete, step 800, or when height calibration is complete, or simply after setup is complete, step 810. After the system has entered into tracking mode, step 810, the zoom is adjusted as the range of remote control 10 changes. Also, as described in reference to FIG. 8, if button 240 of tracking station 100 is not depressed during power up, zoom calibration is omitted, the system goes straight to tracking mode, and parameters for zoom control are loaded from memory. This memory may be one of a microcontroller associated with camera interface 130. If the system enters in tracking mode directly from zoom calibration, the zoom count is maximum, step 805; otherwise, the zoom count is set to zero, step 825. Zoom count is an integer between zero and a maximum. When zoom is incremented the zoom count increases by one and the optics are moved by a unit amount toward zooming in. When zoom is decremented, the opposite occurs. Prior to step 825, data saved from previous zoom calibration are loaded from memory, step 815 and the user manually sets the zoom of camera 210 to wide angle, step 820.

Each time the range is sent from remote control 10 to base 100 along with the pan/tilt and record command settings, step 830, the range is converted to an adjusted range, step 835, that reflects the non-linear relationship between zoom count and zoom range. The latter is the focal distance at a particular zoom setting. The adjusted range is constrained between zero and the max range. The adjusted range calculation is necessary because on most camcorders the relationship between zoom count and zoom range is nonlinear; the relationship, according to experience, is probably satisfactorily approximated by a power law. Hence, in a preferred embodiment of the present invention the following formula is used:

$$\text{Adjusted Range} = \text{Maximum range} \times (\text{range}/\text{Maximum range})^{1/2}.$$

This formula works well for several camcorders by creating a nearly linear relationship between the zoom count and the Adjusted Range. The optimal number for the power in the formula may be other than ½ for a particular camcorder. Using the Adjusted Range ensures that the zoom keeps up with the distance at closer ranges, yet still ends up being correct at maximum range. The use of zoom count is essentially a digitizing tool; the zoom is adjusted in steps rather than continuously. The width of each zoom step between two adjacent zoom counts is equal to the maximum zoom range divided by the zoom count between the camcorder's "wide" and "telephoto" settings. Zoom control with continuous zoom adjustment would work as well but this approach has the advantage that it may be easily programmed. Returning to FIG. 9, based on a comparison between the focal distance corresponding to current zoom count and the Adjusted Range the system automatically decides if the zoom is too wide, step 840, or too narrow, step 850. In either case, the digital nature of zoom count is taken into account and the answer is no (No) as long as the difference is smaller than the difference between the current Adjusted Range and the one that corresponds to the next incremented or decremented zoom count. If that is the case, no action is taken and the system waits for the next range, going back to step 830. If the zoom is too wide, step 840 Yes, zoom count is incremented by one, step 845 before the next range is received. Likewise, if the zoom is too narrow, step 850 Yes, zoom count is decremented by one, step 855 before the next range is received. If the subject exceeds the maximum zoom range, no commands are sent to the camcorder and the zoom count is not incremented.

In a preferred embodiment of the present invention the execution of zoom adjustment is carried out only while there is a momentary pause in the pan or tilt motion of camera 210.

Different embodiments, features and methods of the invention are described with the aid of the figures, however the particular described embodiments, features and methods should not be construed as being the only ones that constitute the practice of the invention and the described embodiments, features and methods are in no way substitutes for the broadest interpretation of the invention as claimed.

What is claimed is:

1. A method for automated self-photography of a user, said method comprising the steps of:

a) determining the location coordinates of a reference point and of a base wherein a camera is associated with the base;
b) storing the location coordinates of the reference point and of the base;
c) orienting the camera at the reference point;
d) determining the location coordinates of a remote control associated with the user;
e) storing the location coordinates of the remote control in the remote control;
f) periodically updating the location coordinates of the remote control;
g) comparing the updated location coordinates of the remote control to immediately preceding location coordinates of the remote control;
h) determining orientation commands if a change in location coordinates is detected;
i) transmitting the orientation commands to the base wherein the camera associated with the base is oriented at the user; and
j) iteratively adjusting the tilt of the camera according to the distance between the base and the reference point to estimate the elevation of the camera and using the estimated elevation of the camera to calculate tilt commands that are transmitted to the base.

2. The method of claim 1, further comprising the step of sending commands to a camera interface associated with the base from the remote unit wherein the commands cause the camera to record or to stop recording.

3. The method of claim 2, further comprising the step of calibrating the zoom control setting of the camera by dividing the zoom control range between wide angle and telephoto into a finite number of stages and associating each stage with a focal length range of the camera and storing this information as zoom calibration data.

4. The method of claim 3, further comprising the step of sending base to remote control distance information to the camera interface and using the base to remote control distance to adjust the zoom of the camera automatically based on said stored zoom calibration data.

\* \* \* \* \*